J. H. FRANZ.
TOOL HOLDER.
APPLICATION FILED DEC. 18, 1911.
1,108,733.
Patented Aug. 25, 1914.
2 SHEETS—SHEET 1.
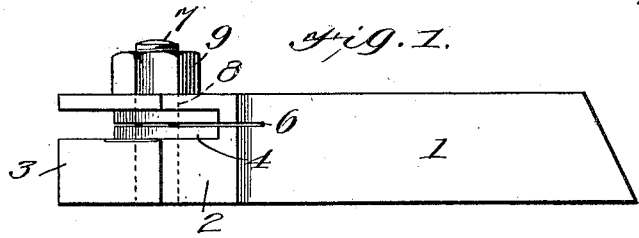
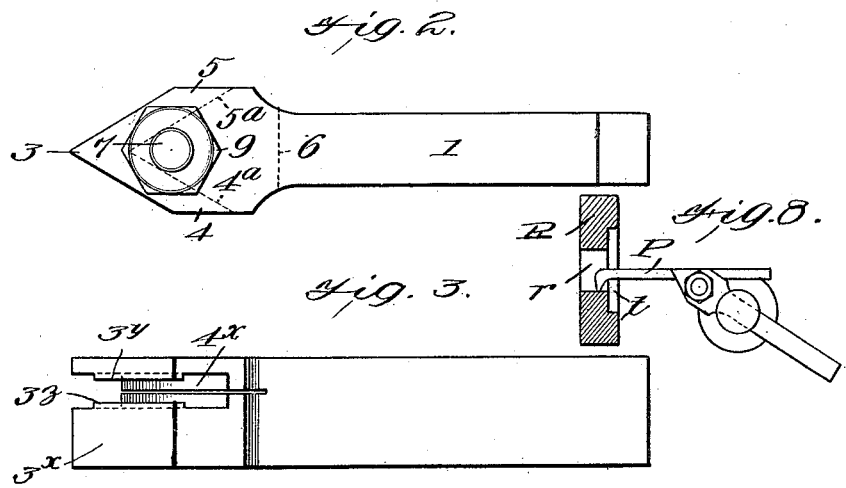
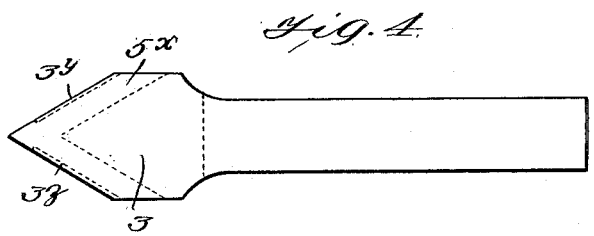
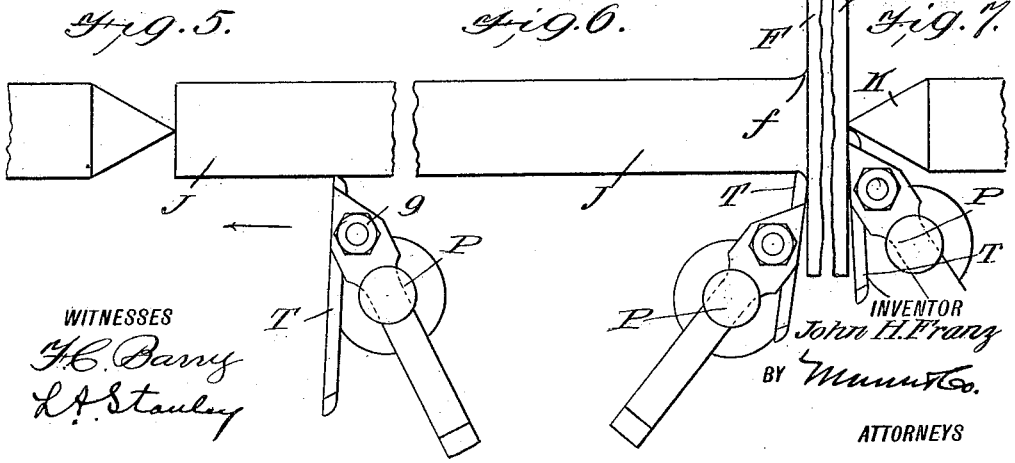
WITNESSES
INVENTOR
John H. Franz
BY
ATTORNEYS J. H. FRANZ.
TOOL HOLDER.
APPLICATION FILED DEC. 18, 1911.
1,108,733.
Patented Aug. 25, 1914.
2 SHEETS—SHEET 2.
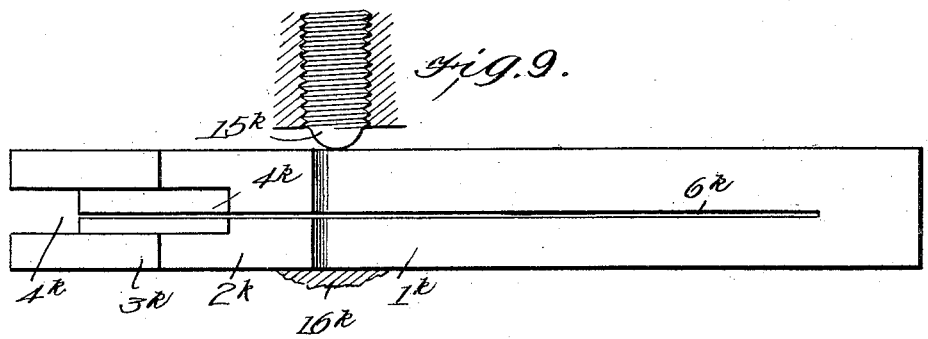
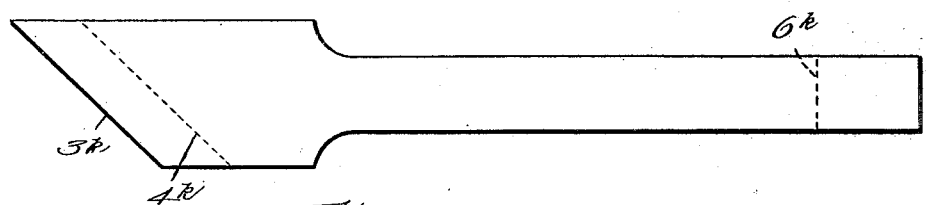
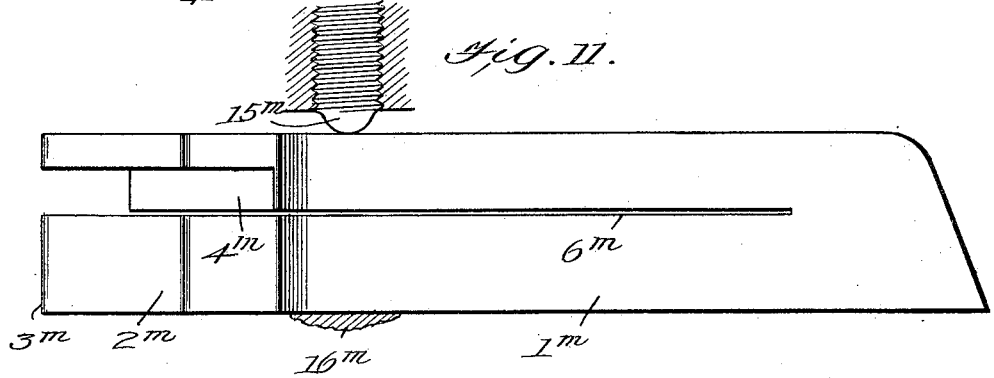
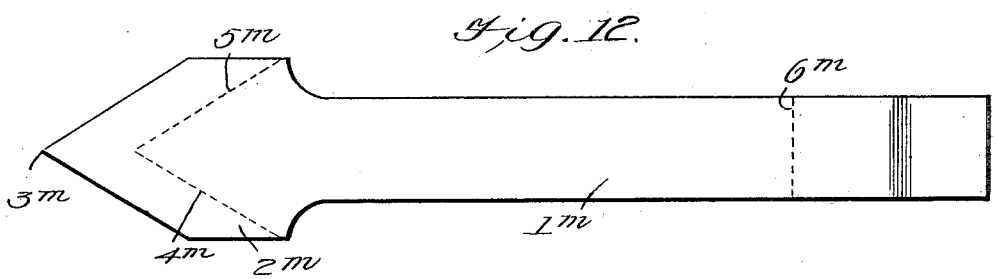
WITNESSES
J. C. Barry
L. P. Stanley
INVENTOR
John H. Franz
BY Munn Co.
ATTORNEYS

UNITED STATES PATENT OFFICE.

JOHN HARRY FRANZ, OF BALTIMORE, MARYLAND.

TOOL-HOLDER.

1,108,733.

Specification of Letters Patent.   Patented Aug. 25, 1914.

Application filed December 18, 1911.   Serial No. 666,323.

*To all whom it may concern:*

Be it known that I, JOHN H. FRANZ, a citizen of the United States, and a resident of Baltimore, in the State of Maryland, have made certain new and useful Improvements in Tool-Holders, of which the following is a specification.

My invention relates to tool holders for lathes, planers, and other metal working machines, and it consists in the combinations, constructions, and arrangements herein described and claimed.

An object of my invention is to provide a device for holding tools in the most advantageous and practicable positions.

A further object of my invention is to provide a device which results in an economy in high grade steel tools.

A further object of my invention is to provide a device in which the removal or replacement of a tool for resharpening or for other purposes is greatly facilitated.

Other objects and advantages will appear in the following specification, and the novel features of the invention will be particularly pointed out in the appended claims.

My invention is illustrated in the accompanying drawings forming part of this application in which—

Figure 1 is a side view of my improved tool holder, Fig. 2 is a plan view thereof, Fig. 3 is a side view of a modified form, Fig. 4 is a plan view of the form shown in Fig. 3, Figs. 5, 6, 7 and 8 are diagrammatic views showing the use of my improved tool holder, Fig. 9 is a side view of a modified form, Fig. 10 is a plan view of the form shown in Fig. 9, Fig. 11 is a plan view of another modified form, and Fig. 12 is a plan view of the form shown in Fig. 11.

Referring now to Figs. 1 and 2, I have shown therein the tool holder which comprises a shank 1 having a head 2, the forward end of the head tapering to an angle at 3. On each side of the head I cut a slot, such as those shown at 4 and 5, the inner walls $4^a$ and $5^a$ of the slots being parallel with the angular front edges of the head, as clearly shown in Fig. 2. A slot 6 is cut in the head and into a portion of the shank parallel with the upper and lower surfaces of the tool holder. A stud bolt 7 is securely fastened to the lower portion of the head below the angular slots 4 and 5 and projects through an opening 8 in the portion of the head above the angular slots. A nut 9 is screwed on to the bolt 7 as shown.

From the foregoing description of the various parts of the device the operation thereof may be readily understood.

A tool such as that shown at T in Figs. 5, 6, 7 and 8 is designed to be placed in either of the angular slots 4 or 5 and to be securely clamped by turning the nut 9. In Fig. 5 is illustrated the ordinary position of a tool when operating on work J in the direction of the arrow. In this figure it will be observed that the tool may be run close to the work, the tool holder being held in the tool post P. It will be apparent that the closeness of the tool holder to the work will permit the use of a smaller tool than if the tool were held directly by the tool post P. In Fig. 6, the tool holder is set so as to work closely up against the flange F of the piece of work J, the tool being shaped to conform to the fillet *f*. In this figure the advantage of the angular shape of the head is at once apparent, since it permits it to come close to the flange F without touching it. In Fig. 7, the tool is working on the opposite face of the flange F, and it will be seen that the tool can be run to the center and yet the tool holder will be out of the way of both the flange and the lathe center K, owing to the angular faces of the holder. In Fig. 8 R represents work which is secured in the chuck of a lathe. In this position a suitable tool P may be used to work in the hole *r*. This may be replaced by any suitable tool to work in the recess *t*.

In Figs. 3 and 4, I have shown a modification in which the head $3^x$ is provided with flanges such as those shown at $3^y$ and $3^z$ on each angular face. The tool in this case is slipped into the slot $4^x$ or $5^x$ as the case may be at one end and the flanges prevent any lateral movement of the tool, such as might occur where the slot is open as shown in Fig. 1.

In Figs. 9 and 10, I have shown a further modification in which the slot $6^k$ extends through the head $2^k$ and the shank $1^k$. In this form of the device the two spring portions made by the slot $6^k$ are forced toward each other by means of the screw $15^k$ and the opposing surface $16^k$ of the tool post. This form of tool holder has only one slot $4^k$, which extends parallel with the angular face $3^k$. It will also be noted that the slot $6^k$ is midway between the upper and lower surfaces of the tool. Such a tool holder as described in Figs. 9 and 10 may be placed in the tool post in reverse position and used as a right or left tool as occasion demands. In this form, as in the one shown the tool is clamped in the angular slot.

In Figs. 11 and 12, I have shown a form which is similar to that shown in Figs. 9 and 10 with the exception that this tool holder has two faces at the forward edge of the head $2^m$ which intersect at $3^m$ and which is provided with angular slots $4^m$ and $5^m$. The slot $6^m$ which extends inwardly from the head through the shank divides the shank $1^m$ and the head $2^m$ into two spring portions which may be clamped together to hold a tool in the slots $4^m$ and $5^m$ by means of the screw $15^m$ of the tool holder and the opposing wall $16^m$.

I claim:—

1. A tool holder comprising a shank, an integral head carried by said shank, said head having angular faces, the planes of said faces intersecting, and each face having an angular slot extending inwardly from the face, the inner walls of the slots being parallel with said faces, said head being divided into two spring portions by means of a slot extending inwardly from the angular intersection of said faces toward the shank, and means for clamping said spring portions together.

2. A tool holder comprising a shank, an integral head carried by said shank, said head having angular faces, the planes of said faces intersecting, and each face having an angular slot extending inwardly from the face, the inner walls of the slots being parallel with said faces, said head being divided into two spring portions by means of a slot extending inwardly from the angular intersection of said faces toward the shank, means for clamping said spring portions together, said means comprising a stud bolt secured in one portion and arranged to pass loosely through the other portion, and a nut disposed on said bolt and arranged to bear on one of said portions.

3. A tool holder comprising a shank, an integral head carried by said shank, said head having angular faces, the planes of said faces intersecting, and each face having an angular slot extending inwardly from the face, the inner walls of the slots being parallel with said faces, said head being divided into two spring portions by means of a slot extending inwardly from the angular intersection of said faces toward the shank, flanges carried by each of said spring portions at the outer edges of said angular slots, and means for forcing said spring portions toward each other.

4. A tool holder comprising a shank having an end face, a slot extending inwardly from said face, whose inner wall is parallel with said face, and whose length is parallel with the base of said tool holder, said shank being divided into two spring portions by a slot extending inwardly from said inner wall, and means for forcing said spring portions toward each other.

5. A tool holder comprising a shank having an end face, a slot extending inwardly from said face, whose inner wall is parallel with said face, and whose length is parallel with the base of said tool holder, said shank being divided into two spring portions by a slot extending inwardly from said inner wall, means for forcing said spring portions toward each other, and dependent flanges carried by each of said spring portions at the outer edge of said slot.

6. A tool holder comprising a shank, an integral head carried by said shank, said head having angular faces, the planes of said faces intersecting, and each face having an angular slot extending inwardly from the face, said head being divided into two spring portions by means of a slot extending inwardly from the angular intersection of said faces toward said shank, and means for clamping said spring portions together.

JOHN HARRY FRANZ.

Witnesses:
ROBERT HENNESSEY,
HERBERT HELFRICH.

---

Copies of this patent may be obtained for five cents each, by addressing the "Commissioner of Patents, Washington, D. C."